United States Patent [19]

Huang et al.

[11] Patent Number: 5,074,665

[45] Date of Patent: Dec. 24, 1991

[54] FIBER OPTIC GYROSCOPE USING DUAL-SECTION COUNTER-WOUND COIL

[75] Inventors: Yung-Yien Huang, Orland Park; Richard B. Dyott, Oak Lawn, both of Ill.

[73] Assignee: Andrew Corporation, Orland Park, Ill.

[21] Appl. No.: 454,702

[22] Filed: Dec. 21, 1989

[51] Int. Cl.$^5$ .............................................. G01C 19/72
[52] U.S. Cl. ................................................... 356/350
[58] Field of Search .............................. 356/350, 345; 250/227.19

[56] References Cited

U.S. PATENT DOCUMENTS 4,545,682 10/1985 Greenwood.

FOREIGN PATENT DOCUMENTS 0169714 7/1986 Japan ................................. 356/350

OTHER PUBLICATIONS

Bergh et al., "An Overview of Fiber-Optic Gyroscopes", pp. 91-107, Journal of Lightwave Technology, vol. LT-2, No. 2, Apr. 1984.
Giallorenzi et al., "Optical-Fiber Sensors Challenge the Competition", IEEE Spectrum, Sep. 1986, pp. 44-49.
Bergh et al., "All-Single-Mode Fiber-Optic Gyroscope", Optics Letters, Apr. 1981, pp. 198-200.

Primary Examiner—Samuel Turner
Attorney, Agent, or Firm—Kareem M. Irfan

[57] ABSTRACT

An improved fiber optic rotation sensing technique and an improved optical fiber gyro are provided which exhibit increased sensitivity to and linearity of rotation measurement by using a special dual-section, counter-wound fiber coil for measuring the Sagnac phase shift resulting from rotation of the coil. The optical fiber coil has a plurality of turns and is formed of at least two separate interconnected coil sections each having a predefined number of turns of fiber. In the gyro arrangement, the separate sections are axially disposed adjacent to each other in such a way that the direction of winding of the turns in one of the coil sections is counter to the direction of winding of the turns in the other of the coil sections. The plurality of turns in each coil section is selected to be such that the sum of the effective lengths defined thereby is sufficient to realize the desired gyro modulation frequency. At the same time, the Sagnac phase shift for a given rotation rate is made proportional to the difference between the effective lengths of the coil sections and remains within a desired threshold level even if the overall effective length of the fiber coil is increased.

3 Claims, 2 Drawing Sheets

FIBER OPTIC GYROSCOPE USING DUAL-SECTION COUNTER-WOUND COIL

BACKGROUND OF THE INVENTION

1. Field of the Invention

The present invention generally relates to fiber optic rotation sensors or gyroscopes. More particularly, this invention relates to an improved fiber optic gyroscope adapted to efficient matching of effective coil length to phase modulation frequency in an open-loop rotation sensing system.

2. Description of Related Art

Fiber optic rotation sensors or gyros, as they are commonly called, are increasingly being used for detection of rotation, particularly in navigation systems where accurate and reliable sensing of inertial rotation is highly critical, such as those used in aircraft, spacecraft and related defense applications.

In comparison with rotation sensing systems using mechanical gyroscopes, fiber optic gyros offer several distinct advantages including the absence of moving parts, warm-up time and g-sensitivity. In particular, the liberation from the unavoidable problems associated with moving parts, and the extreme cost reduction and potential for high reliability realized thereby, makes fiber optic gyros highly desirable for use in inertial navigation systems.

In a typical fiber optic gyro light from a laser or some other suitable light source is divided into two separate beams by means of some form of a beam splitter and then coupled into the two ends of a multiturn coil of optical fiber, typically of the single-mode type. Light emerging from the two fiber ends is combined by the beam splitter and detected by a photodetector.

Rotation sensing is typically accomplished by detection of a rotationally induced phase shift, commonly referred to as the "Sagnac Phase Shift", between the light beams propagating in opposite directions around the closed loop formed by the coil of optical fiber. The detected signal corresponding to the phase difference between the opposing beams is typically subjected to some form of phase modulation and the photodetector converts the modulation to an electric signal which is indicative of the degree of rotation of the fiber coil and is electronically processed to provide a direct indication thereof.

In fiber optic gyros of the above type, the sensitivity of a gyro having a fixed coil diameter is directly proportional to the distance travelled by the counter-propagating beams within the fiber coil. Thus, sensitivity may be enhanced by increasing the length of the fiber by winding more turns on the coil. Further, since the gyro modulation frequency is inversely proportional to fiber length, it is desirable to maintain the fiber length at levels which realize a convenient modulation frequency.

The finite signal attenuation levels in optical fiber generally restricts the maximum length of fiber which can be used for accurate signal detection and processing. However, a more important consideration in operating fiber optic gyros is maintaining a threshold degree of linearity between the gyro output and the rotation being sensed. Linearity of the gyro output is proportional to the degree of phase shift realized for a given rotation rate which, in turn, is proportional to the coil diameter and fiber length. Because of inherent constraints on the minimum bending radius of optical fibers, the only remaining practical approach to maximizing output linearity is to decrease the coil length which, consequently, raises the phase modulation frequency of the gyro to a level which is impractical for use with conventional modulators.

Conventional fiber optic rotation systems have restricted applications because of a persisting inability to maximize both sensitivity (by minimizing biasing phase noise) and linearity by achieving an adequate compromise between the abovediscussed conflicting constraints involved in matching the effective coil length to the phase modulation frequency. The present invention effectively and conveniently realizes such a compromise, as will be described below in detail.

SUMMARY OF THE INVENTION

It is a primary object of this invention to provide an improved fiber optic rotation sensing technique and an improved optical fiber gyro which exhibits increased sensitivity to and linearity of rotation measurement.

A related object of the present invention is to provide an improved rotation sensing technique and, specifically, an improved fiber optic gyro of the above type adapted to convenient matching of the effective coil length to the phase modulation frequency in an open-loop rotation sensing system.

Yet another object of this invention is to provide an improved optical fiber coil, and a winding method for the same, which are specifically adapted for use in an optical fiber gyro of the foregoing type.

The above and other objects are realized, in accordance with the system of this invention by winding a N-turn fiber coil for an optical fiber gyro in the form of separate, yet interconnected coil sections including a first coil section which comprises a first plurality of turns "$N_1$" wound in a first direction and a second coil section which comprises a second plurality of turns "$N_2$" wound in a second direction counter to the first direction. The interconnected coil sections are disposed axially adjacent to each other and, in combination, constitute the equivalent of conventional single section, uni-directional fiber coils. The dualsection, counter-wound coil is advantageous in that the separate plurality of turns $N_1$, $N_2$ of the two coil sections and, hence, the respective effective lengths ($L_1$, $L_2$) thereof, can conveniently be selected to be such that the sum of the lengths $L_1$ and $L_2$ is sufficient to achieve the desired phase modulation frequency for the gyro.

At the same time, since the directions of winding in the two coil sections are counter to each other, the effect phase shift becomes a function of the difference in the effective lengths $L_1$ and $L_2$. Accordingly, it becomes possible to increase the overall effective length of the coil while, at the same time, maintaining the degree of phase shift, and, hence, the linearity of measurement, within a desired threshold level.

Figure 1:
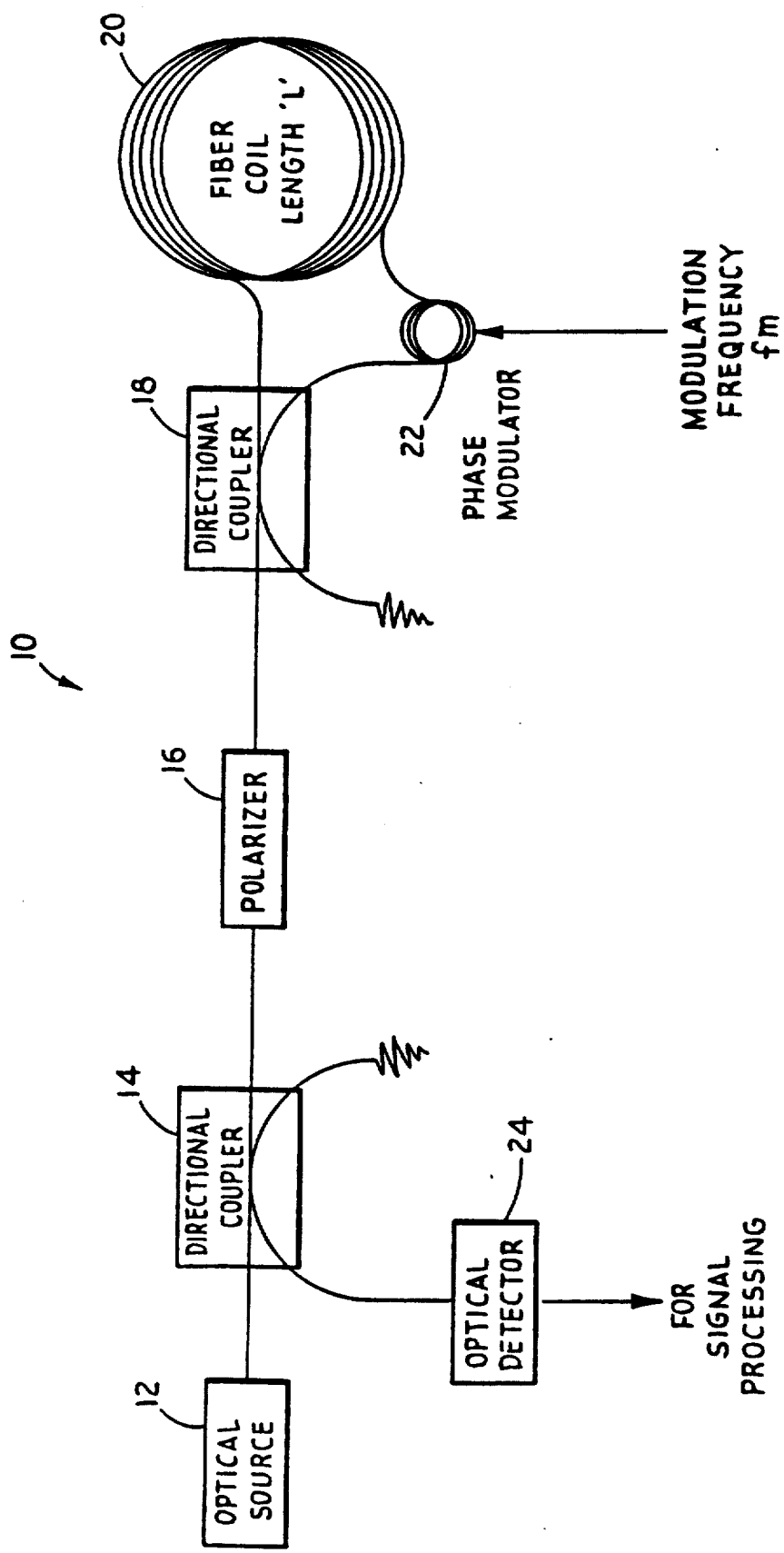
FIG. 1 is a block diagram illustrating a conventional open-loop optical fiber gyro arrangement.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Referring now to FIG. 1, there is shown a block diagram illustrating a conventional optical fiber gyro system operating in an open-loop mode. The gyro system 10 includes an optical source 12 which is preferably a diode laser oscillating predominantly in a single transverse mode and having a broad and Gaussian-shaped optical spectrum so that back-scatter noise and Kerr effect problems are reduced. A light beam from the optical source 12 is directed to a optical directional coupler 14 which functions as a beam splitter.

A portion of the light beam entering the directional coupler 14 is transmitted through a polarizer 16 before being directed into a second optical directional coupler 18. The direction coupler 18 also functions as a beam splitter to realize two separate light beams, one of which is directed into one end of a multiturn fiber coil 20. The other 1 ight beam from the directional coupler 18 is directed through a phase modulator 22 into the other end of the fiber coil 20. Light emerging from the two fiber ends is combined by the directional coupler 18 and detected by an optical photodetector 24.

The light beams directed into the two ends of the fiber coil 20 constitute counter-propagating beams which have identical path lengths in the absence of coil rotation. When the fiber coil 20 undergoes rotation about its axis of symmetry, the relative path lengths of the two light beams also change correspondingly. For instance, if the coil rotates in a clockwise direction, the path length of the clockwise beam is increased while the path length of the counterclockwise beam decreases. As a result, any rotation of the optical fiber coil causes the two counter-propagating beams to undergo a non-reciprocal phase shift. This phenomenon is known as the Sagnac effect and the non-reciprocal phase shift due to rotation is termed as the Sagnac phase shift which, if measured accurately, provides a true indication of the degree of rotation experienced by the fiber coil.

In the gyro arrangement of FIG. 1, the output of the photodetector 24 becomes available for conventional signal processing to provide an outward indication of the rotation rate being sensed.

It is important that the two counter-propagating light beams have the same phase in order that the reciprocal Sagnac phase shift accurately correspond to the sensed rotation rate. If the states of polarization of the two counter-propagating light beams are not identical, their propagation constants are not necessarily the same. Consequently, the phases of the two interfering beams may differ after the beams pass through the fiber loop, thereby leading to a sensing error which can substantially impair measurement accuracy, particularly when extremely low rotation rates are sensed. For instance, the phase difference resulting from bending (stress-induced) birefringence in a typical fiber coil, which can be of the order of several hundred radians, can totally obscure the Sagnac phase shift realized when a gyro rotates at earth rate, which is of the order of $10^{-4}$ rad.

This sensing error is reduced by using the portions of the light beams that have passed through the fiber coil with identical polarization states. In order to assure total reciprocity of the sensing system, it is also important that the counter-propagating light beams comprise only a single state of polarization. Even when symmetric single-mode fiber is used, two deqenerate polarization modes are generated. A small amount of random asymmetry exists in real fiber and results in a small amount of random birefringence which, coupled with additional birefringence created by bending and twisting of the fiber, causes the polarization of the light guided along the fiber to vary along the length of the fiber.

The polarizer 16 in FIG. 1 performs the function of ensuring that the sensed portions of the counter-propagating light beams, by reciprocity, have identical states of polarization at each point along the fiber. Under these conditions, any sensed phase difference between the interfering beams results from the Sagnac effect and not due to fiber birefringence.

In the measurement of rotation based on the Sagnac effect and using a gyro system of the type illustrated in FIG. 1, the Sagnac phase shift "$\phi$" (radians) in the detected signal at a given frequency $f_m$ is given by the following relationship.

$$\phi = \frac{4w_0 \Omega}{C^2} \cdot A \quad (1)$$

where $w_0$ is the radian frequency of the optical source in radians/sec, $\Omega$ is the rate of rotation of the gyro in radians/sec, C is the velocity of light in free space in metres/sec, and A is the total area enclosed by the fiber coil as represented by the product of the area enclosed by a single turn of fiber and the number of turns in the coil.

In measuring the Sagnac phase shift $\phi$, the measured optical power is proportional to the square of the absolute value of the detected electric field. Further, the optical power and phases of the interfering light beams are equal in a reciprocal system. Ignoring the non-reciprocal power difference, which is negligible for the typically used coil lengths, the detected power $P_D$ is largely dependent upon the non-reciprocal phase difference $\phi_{NR}$ and is related to the input power $P_0$ as below:

$$P_D = \frac{P_0(1 + \cos\phi_{NR})}{2} \quad (2)$$

The cosine factor in Equation (2) approaches its maximum value when the total non-reciprocal phase difference is much less than 1 rad. Thus, the detected power becomes insensitive to the typically small phase shifts induced due to rotation. It, therefore, becomes necessary to add a biasing phase difference to shift the sensed signal so as to avoid both the maxima and minima of the sinusoid.

The phase modulator 22 in the gyro system of FIG. 1 performs this function by creating the desired amount of phase difference modulation so that the amplitude of the optical power, which varies at the frequency of phase modulation $f_m$, is made proportional to small rotation rates. Since the phase modulator 22 is positioned at one end of the fiber coil 20, the two counter-propagating light beams both receive the same phase modulation but at different times, thereby realizing a non-reciprocal phase difference modulation between the interfering beams. Since the sensed signal becomes biased on a high-frequency carrier, i.e., the phase modulation signal, electronic noise is substantially eliminated while measurement sensitivity is increased.

In accordance with an all-fiber implementation of the gyro arrangement shown in FIG. 1, a unitary stretch of optical fiber is used for the fiber coil, with a length of fiber extending from one end of the coil being used to establish a light path between the optical source 12, the directional coupler 14, the polarizer 16, the coupler 18 and the corresponding end of the coil 20. A length of fiber extending from the other end of the coil 20 establishes a light path between the corresponding coil end, the phase modulator 22 and the directional coupler 18.

The directional couplers 14 and 18 are also formed of the optical fiber used for the fiber coil. The couplers are generally formed by using optical fibers having special non-concentric cores which facilitate coupling of the evanescent fields about the cores of adjacently positioned fibers.

The polarizer 16 itself can be a fiber optic component using, in its simplest form of implementation, a pair of fiber loops with principal axes in the plane of each loop and perpendicular to it. The orientations of the planes of each of the loops can be conveniently adjusted to achieve any desired transformation of the state of polarization from one end of the stretch of fiber to the other.

The phase modulator 22 is typically of the mechanical modulation type wherein a short section of optical fiber is wrapped over a piezoelectric (PZT) cylinder. When a time-varying electric field is applied to the PZT cylinder, mechanical stress is induced therein and varies the radius of the cylinder. As a result, the diameter of the fiber around the PZT cylinder is also varied correspondingly. Hence, the fiber diameter and refractive indices and, therefore, the phase of the wave being guided through the polarizer, are modulated in proportion to the applied signal.

As is evident from Equation (1), in fiber optic gyro systems of the type illustrated in FIG. 1, the Sagnac phase shift and, hence, the sensitivity of measurement, is directly proportional to the total area enclosed by the fiber coil, i.e., the product of the area enclosed by one turn of the fiber coil and the total number of turns in the coil. For a coil having a fixed coil diameter, the sensitivity, which is proportional to the overall distance travelled by the counter-propagating beams within the coils, can be enhanced by increasing the number of turns on the coil.

For optimizing the performance of the gyro system of FIG. 1, rotation sensitivity must be maximized and noise sensitivity must be minimized. To accomplish this, it is necessary to match the transit time "t" required for the counter-propagating light beams to traverse the length of the fiber coil with the phase modulation frequency "$f_m$" according to the following relationship:

$$W_m \cdot t = \pi \tag{3}$$

where $w_m$ is the radian frequency of the modulation source and is equal to $2\pi f_m$. In terms of the group velocity "$V_g$" of the optical wave guided by the fiber, the transit time "t" is defined as below:

$$t = \frac{L}{V_g} \tag{4}$$

where L is the coil length in meters and $V_g$ is the group velocity in meters/second.

Substituting from Equation (4) into Equation (3), the modulation frequency $f_m$, accordingly, is defined as below:

$$f_m = \frac{V_g}{2L} \tag{5}$$

Since the group velocity $V_g$ is approximately equal to $C/n_c$ where $n_c$ is the average refractive index of the fiber core and cladding and C is the velocity of light, the quantity $V_g$ represents a constant. Accordingly, the modulation frequency $f_m$ is inversely proportional to the coil length.

In operating fiber optic gyros, an important consideration is maintaining a high degree of linearity between the gyro output and the rotation being sensed. The gyro output is proportional to the Sine of the Sagnac phase shift, i.e., Sin $\phi$. At small rotation rates, the phase shift $\phi$ is small so that Sin $\phi$ approximates $\phi$ and the gyro output is nearly linear with rotation.

The percentage non-linearity of gyro output is defined as below:

$$N = 100\left(1 - \frac{\sin\phi}{\phi}\right)\% \tag{6}$$

At slower rotation rates, the non-linearity is negligible and can easily be corrected by the use of appropriate modelling techniques at the signal processing stage. However, at higher rotation rates, the non-linearity becomes appreciable and cannot be corrected adequately during signal processing.

As evident from Equation (1), for a given rotation rate $\Omega$, the Sagnac phase shift $\phi$, which is directly proportional to the total area enclosed by the fiber coil, may be reduced by decreasing the coil diameter. However, the minimum practical diameter of the fiber coil is restricted by the minimum bending radius of the optical fiber used for the coil.

The only other alternative to reducing the phase shift $\phi$ is to decrease the length of the coil. This approach is problematic because any decrease in the length of the fiber coil correspondingly raises the modulation frequency in accordance with the inversely proportional relationship set forth in Equation (5). In order to maintain the degree of non-linearity typically required for high-accuracy rotation sensing applications, the length of the fiber coil has to be decreased to such an extent that the modulation frequency increases to a level which is unacceptably high for use with PZT phase modulators.

Accordingly, there exists an outstanding need to achieve an adequate compromise between the aboveenumerated conflicting constraints involved in matching the effective coil length to the phase modulation frequency in optical fiber gyros in order to maximize both sensitivity and linearity of measurement.

In accordance with the system of this invention, such a compromise is efficiently realized by winding the optical fiber coil for the gyro in such a way that the fiber length L is kept sufficiently long to permit use of a convenient modulation frequency that is not too high, while, at the same time, reducing the Sagnac phase shift $\phi$ to within a desirable threshold. More specifically, a N-turn fiber coil for an optical fiber gyro is wound in the form of separate, yet interconnected coil sections including a first coil section which comprises a first plurality of turns $N_1$ wound in a first direction and a second coil section which comprises a second plurality of turns $N_2$ wound in a second direction counter to the first direction. The interconnected coil sections are disposed axially adjacent to each other and, in combination, constitute the equivalent of a conventional single section, uni-directional fiber coil.

Figure 2:
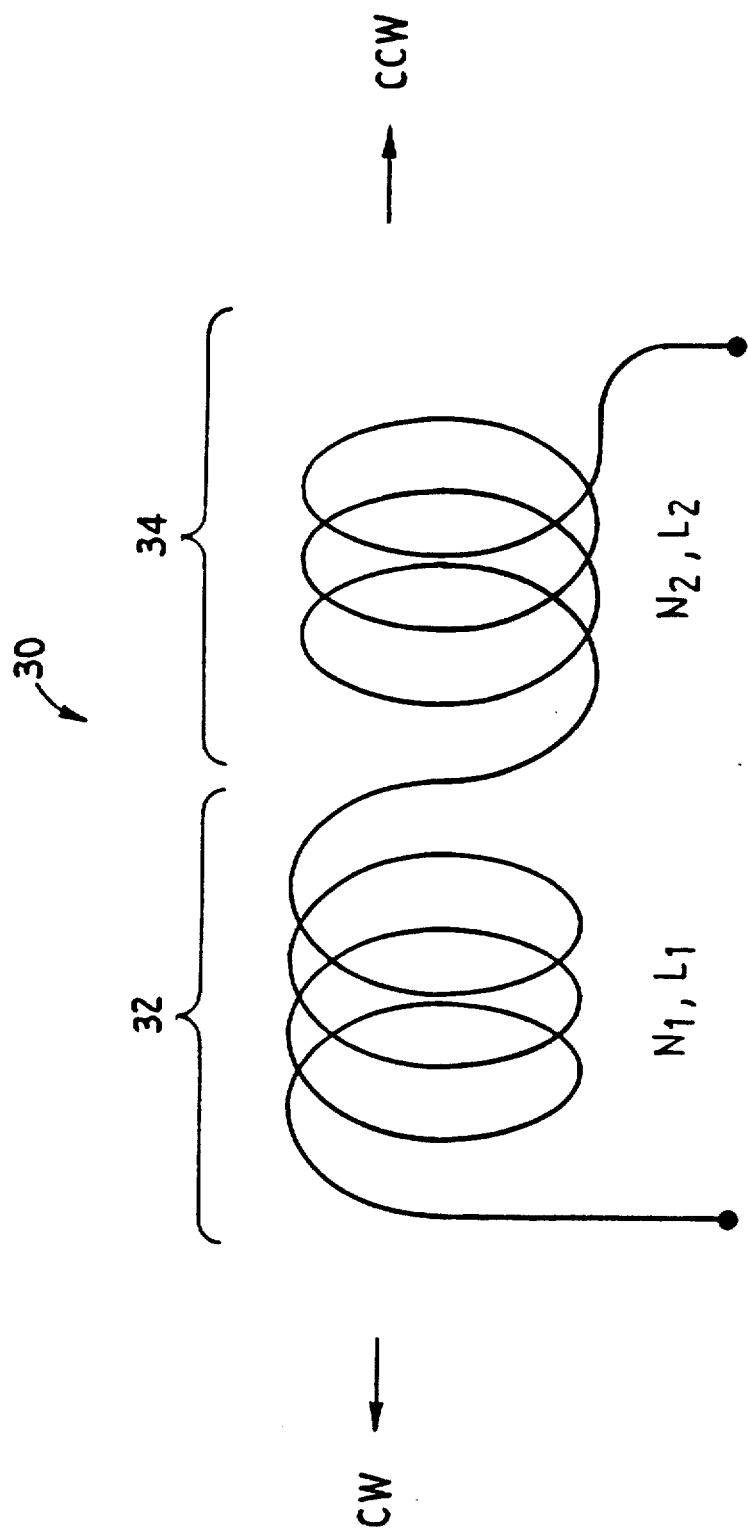
FIG. 2 is an illustration of an improved dualsection winding arrangement of a fiber coil adapted for use in the gyro arrangement of FIG. 1, in accordance with a preferred embodiment of this invention.

As illustrated in FIG. 2, such a counter-wound, dual-section coil 30 is formed of separate coil sections 32 and 34. The first coil section 32 comprises a plurality of turns $N_1$ wound in a clockwise direction to realize an effective coil section length $L_1$. The second coil section 34 comprises a second plurality of turns $N_2$ wound in a counterclockwise direction to realize an effective coil section length $L_2$. The two coil sections 32 and 34 are serially connected together to realize the complete fiber coil for the gyro having an active coil length L defined by the sum of $L_1$ and $L_2$.

The dual-section, counter-wound coil illustrated in FIG. 2 is advantageous in that the separate plurality of turns $N_1$, $N_2$ of the two coil sections and, hence, the respective effective coil section lengths $L_1$, $L_2$ thereof, can easily be selected to be such that the sum of the length $L_1$ and $L_2$ realizes the desired phase modulation frequency for the gyro.

More importantly, since the directions of winding in the two coil sections are counter to each other, the effective phase shift becomes a function of the difference in the effective coil section lengths $L_1$ and $L_2$ of the separate coil sections 32 and 34. Accordingly, the overall effective Length of the coil can be increased while, at the same time, maintaining the degree of phase shift at a desired level. As a result, it becomes possible to conveniently manipulate the respective effective coil section lengths $L_1$ and $L_2$ so as to simultaneously achieve the desired phase modulation frequency and the desired linearity of measurement.

In practice, a dual-section, counter-wound coil according to the preferred embodiment of FIG. 2 can be manufactured easily using techniques conventionally used for winding coils of optical fiber. More specifically, the coil is wound on a mandrel in two coil sections about a single winding direction and in accordance with the length requirements of the individual sections. Subsequently, one of the coil sections is slipped off the mandrel and flipped or turned around about its axis before positioning both sections adjacent to each other within the gyro enclosure. Using this approach, the optical fiber in one coil section runs in a direction counter to the fiber in the adjacent coil section, without the need for actual winding to take place in counter directions.

The advantage realized by the dual-section counter-wound optical fiber coil, in accordance with the system of the present invention, is best illustrated by considering the practical example discussed below.

Consider a fiber optic gyro having a coil diameter of $d = 0.127$ m and a fiber length $L = 755$ m wound in a conventional uni-directional manner. If a light source having a wavelength $\lambda_0 = 815$ nm is used, the radian frequency $w_0$, which is defined by $2\pi c/\lambda_0$, equals $2.31 \times 10^{15}$ radians/second.

The total area A enclosed by the coil is defined by $L \cdot D/4$ and equals 23.97 m$^2$.

For a rotation rate $\Omega = 10°$/sec., i.e., 0.175 radians/sec., the Sagnac phase shift $\phi$ defined by Equation (1) equals 0.43 radians.

Under these conditions, the non-linearity of the gyro, as defined in accordance with Equation (6), turns out to be 3.05%.

The phase modulation frequency $f_m$ required to achieve the desired phase delay of $\pi$ radians along the 755 meter length of fiber, as defined in accordance with Equation (3), is approximately equal to 135 kHz. The exact value of the desired phase modulation frequency can be calculated by using the value of group velocity computed for the particular optical fiber being used.

In order to achieve a given maximum rotation rate, say 720°/sec., and, at the same time, maintain the same degree of non-linearity (and therefore the same degree of phase shift $\phi = 0.43$ radians), it becomes necessary to reduce the coil length by a factor $720/10 = 72$ so that the effective coil length becomes $755/72$, i.e., 10.5 m. For a uni-directionally wound coil, this length would entail a modulation frequency $f_m = (135 \text{ kHz} \cdot 72) = 9.72$ MHz. This frequency is unacceptably high for conventional PZT modulators.

If a dual-section, counter-wound coil of the type illustrated in FIG. 2 were to be used with the same total fiber length of 755 m, the phase modulation frequency $f_m$ remains unchanged at the same level, i.e., 135 kHz. However, the desired "Sagnac" length of 10 m can be achieved by designing the two separate coil sections comprising the counter-wound fiber coil in such a way that the respective coil section lengths $L_1$ and $L_2$ exhibit the following relationships:

$$L_1 + L_2 = 755 \text{ m; and}$$

$$L_1 - L_2 = 10 \text{ m}$$

Thus, the effective coil section lengths would be $L_1 = 382.5$ m and $L_2 = 372.5$ m.

Accordingly, the individual coil section lengths can be conveniently manipulated so as to maximize the sensitivity of measurement while permitting the use of a convenient modulation frequency.

We claim:

1. In a fiber gyro including a source of light, a coil of optical fiber having a plurality of turns and a corresponding effective coil length upon which the modulation frequency and Sagnac phase shift of the fiber gyro is dependent, said coil bieng rotatable about an axis of sensitivity, means for optically coupling light from the source to the coil to create counter-propagating beams therethrough, and photodetecting means receiving said counter-propagated light beams for producing an output signal indicative of the coil rotation rate, the improvement whereby said optical fiber coil is formed from separate interconnected coil sections includign a first section comprising a first plurality of turns wound in a first direction and having a first effective section length, and a second section codmprising a second plurality of turns wound in a direction counter to said first direction and having a second effective section length, said first and second plurality of turns being selected to realize the desired modulation frequency and Sagnac phase shift by correspondingly defining said first and second effective section lengths.

2. A fiber optic gyro comprising:
a source of light;

a coil of optical fiber having a plurality of turns and a corresponding effective coil length upon which the modulation frequency and Sagnac phase shift of the fiber gyro is dependent, said coil being formed of at least two separate interconnected coil sections having first and second pluralities of turns of fiber, respectively, and corresponding first and second effective section lengths, said separate sections being axially disposed adjacent to each other in such a way that the direction of winding of the turns in one of said coil sections is counter to the direction of winding in the other of said coil sections;

means for optically coupling light from the source to the coil to create counter-propagating beams therethrough; and photodetecting means receiving said counter-propagated light beams for producing an output signal responsive to the rate of rotation of said coil;

said first and second plurality of turns of said sections being selected to realize a desired modulation frequency and Sagnac phase shifty by correspondingly defining said first and second effective section lengths.

3. An improved fiber optic coil for use in fiber optic gyros using the Sagnac or Doppler-shift effects for measurement of rotation, wherein the modulation frequency and Sagnac phase shift is dependent upont he effective length of said fiber coil, said coil comprising a plurality of turns of optical fiber and being formed of at least two separate interconnectd coil sections each having first and second pluralities of turns, respectively, and corresponding first and second effective section lengths, said separate sections being axially disposed adjacent to each other in such a way that the direction of winding of the turns in one of said coil sections is counter to the direction of winding of the turns in the other of said coil sections, said first and second plurality of turns being selected to realize a desired modulation frequency and Sagnac phase shift by correspondingly defining said first and second effective section lengths.

* * * * *